United States Patent Office 3,499,348
Patented Mar. 10, 1970

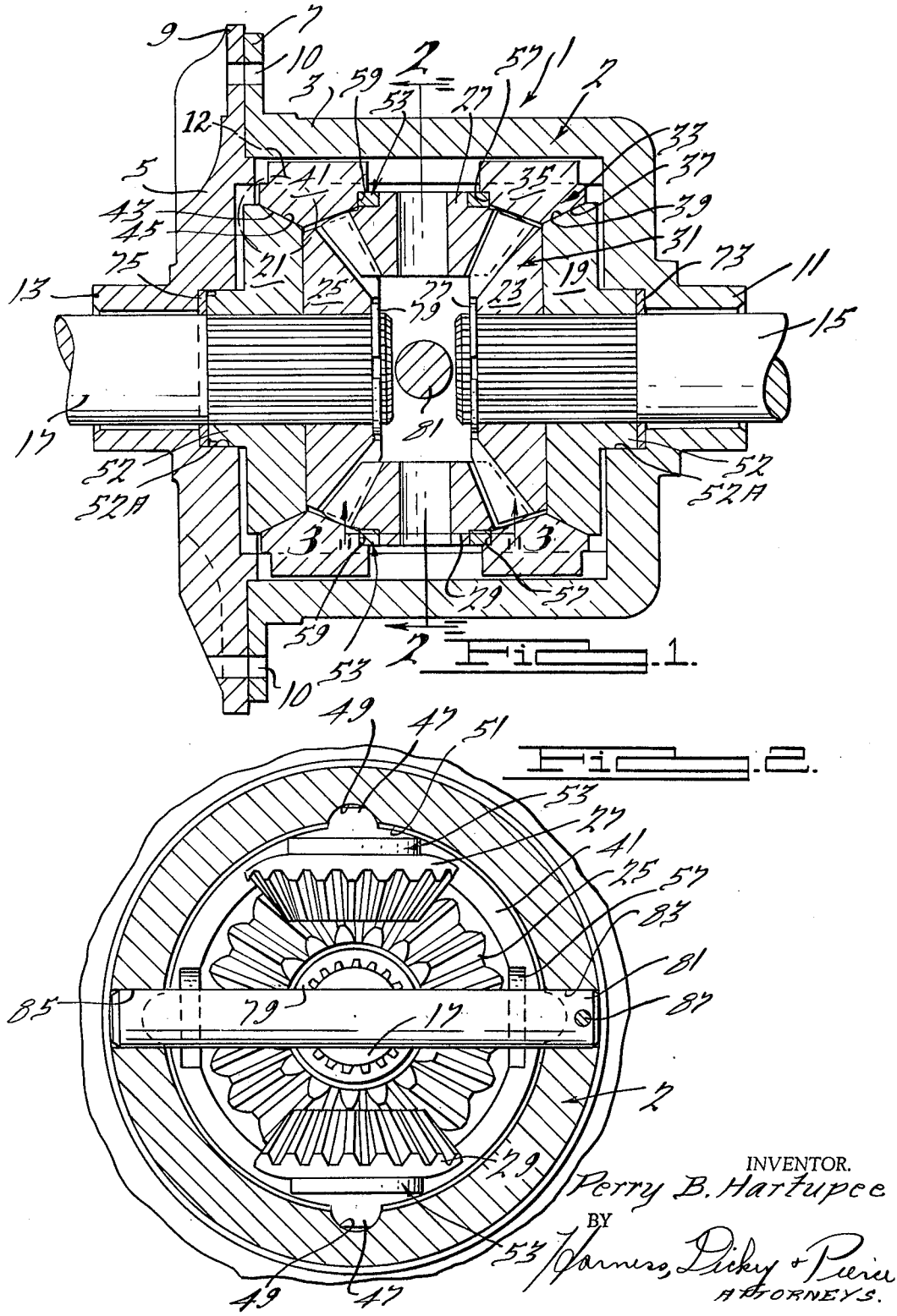

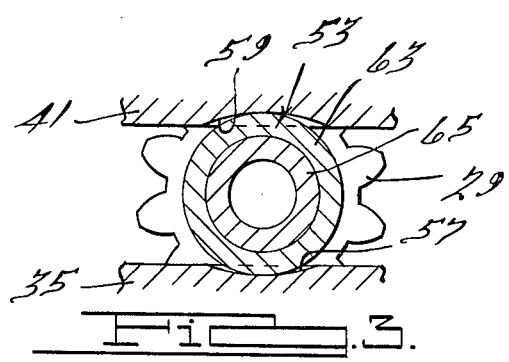
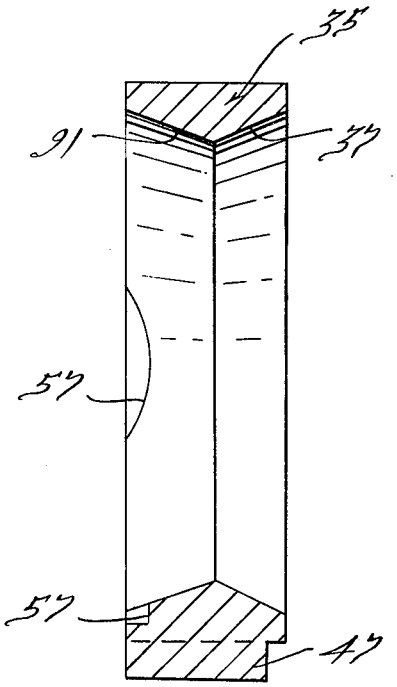
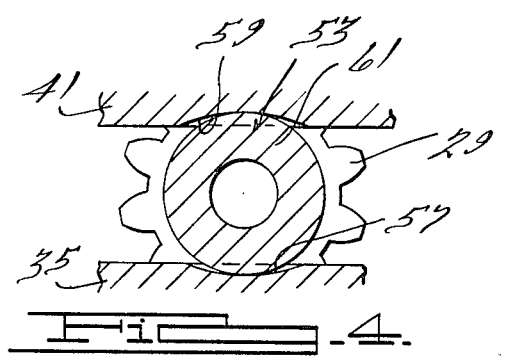
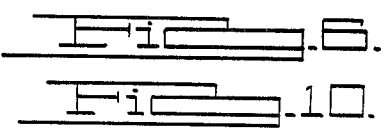
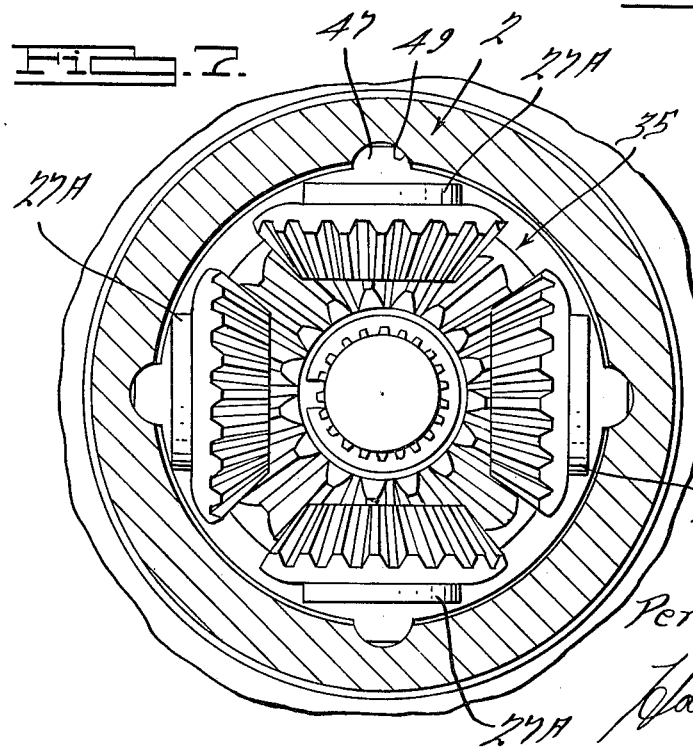
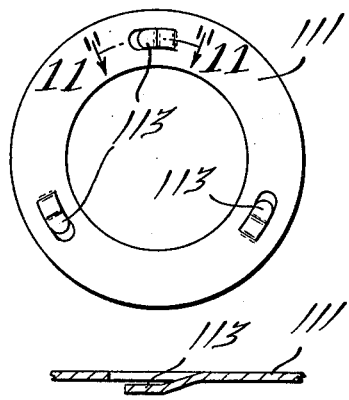

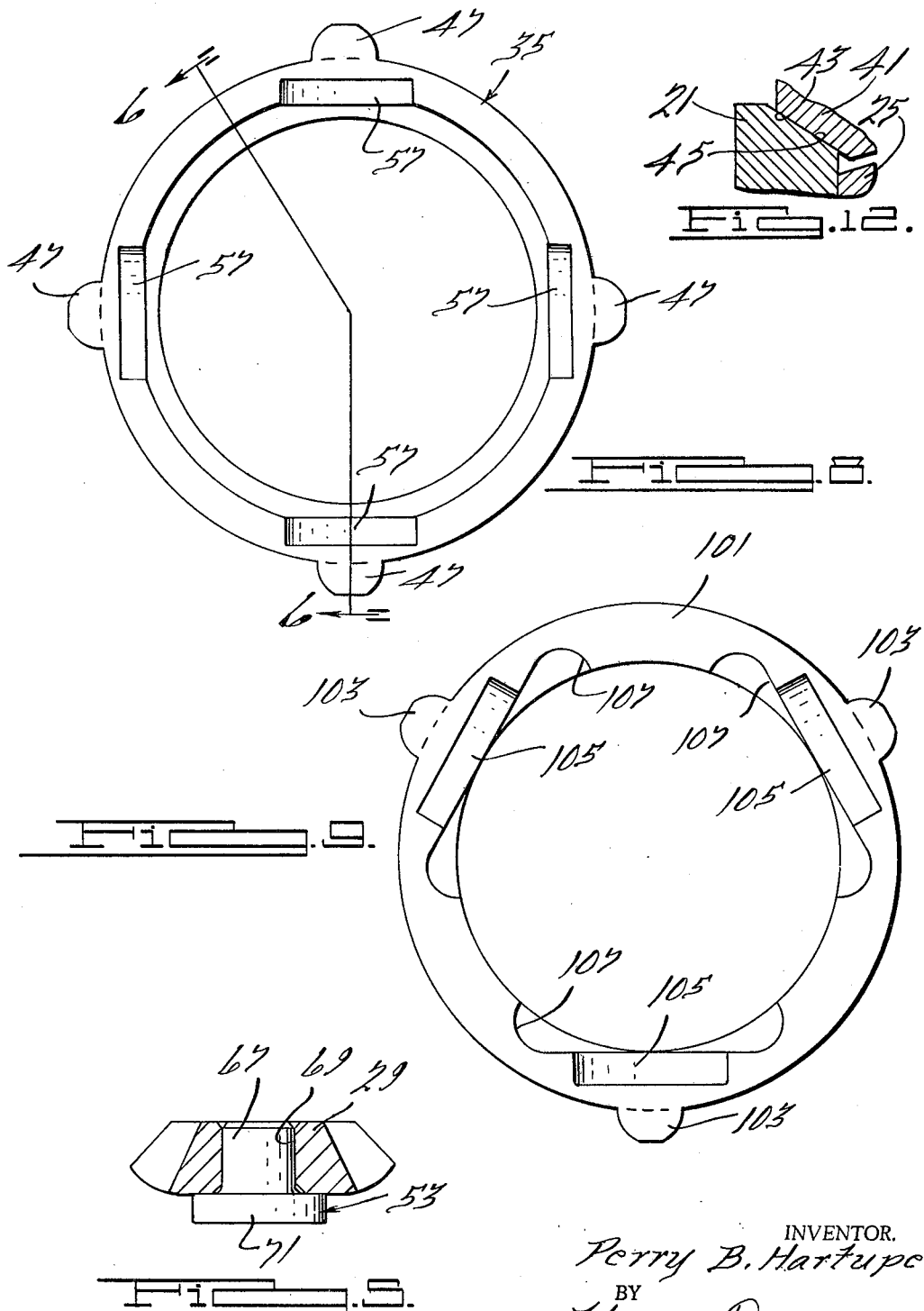

3,499,348
LOCKING DIFFERENTIAL
Perry B. Hartupee, Royal Oak, Mich., assignor to Powr-Lok Corporation, Detroit, Mich., a corporation of Michigan
Filed Oct. 9, 1967, Ser. No. 673,751
Int. Cl. F16h 1/44
U.S. Cl. 74—710.5   18 Claims

ABSTRACT OF THE DISCLOSURE

A locking differential without a spider pin has two or more floating pinions meshing with side gears. The pinions have hub means which form a part of a cam means for locking and unlocking staggered cone type clutches to permit drive to the axles or normal differentiation.

SUMMARY OF THE INVENTION

It is the purpose of the invention to provide a simplified, long wearing locking differential construction characterized by smooth, silent locking and unlocking action. It accomplishes this by means of a construction having pinion gears carried by the side gears and without a spider pin. The pinion gears have hub means to operate clutches comprising inner and outer cones which are staggered and of slightly different cone angle and one of which is preferably slightly flexible.

DESCRIPTION OF THE DRAWINGS

FIG. 1 is an axial cross section through one form of differential embodying the invention;

FIG. 2 is a cross section taken along the line 2—2 of FIG. 1;

FIG. 3 is a section along line 3—3 of FIG. 1;

FIG. 4 is a section similar to FIGURE 3 showing a modified form of pinion gear hub means;

FIG. 5 is a detail subassembly showing another form of hub means;

FIG. 6 is a cross section through the drive cone as taken on line 6—6 of FIG. 8;

FIG. 7 is a cross section similar to FIG. 2 showing the use of four pinions in an application which does not require means to prevent shifting of the axles;

FIG. 8 is a side elevation of a drive cone that can be used with two or four pinions;

FIG. 9 is a side elevation of a modified cone that can be used with three pinions;

FIG. 10 is a plan view of a spring thrust washer for preloading; and

FIG. 11 is a section along line 11—11 of FIG. 10.

FIG. 12 is an enlarged view of the structure within the circle 12 of FIG. 1, shown in somewhat exaggerated form.

DESCRIPION OF PREFERRED EMBODIMENTS

The differential 1 has a two piece case 2 comprising a housing 3 and a cover 5, the housing and cover having engaged flanges 7 and 9 with aligned bolt receiving holes 10 whereby the differential can be secured to and rotated by the differential ring gear (not shown) of the motor vehicle power drive train. The housing 3 and cover 5 have aligned journal portions 11 and 13 through which extend the inner ends of the axles 15 and 17 which are to be rotated by the differential 1. Splined on to the axle 15 is a wheel cone 19 and splined on to the axle 17 is a wheel cone 21. Splined on to the innermost end of axle 15 is a side gear 23 and splined on to the innermost end of the axle 17 is a side gear 25. Meshing with the teeth of both side gears 23 and 25 are the teeth of a pair of pinion gears 27 and 29 and the side gears rotatably support the pinion gears since there is no spider or pinion pin. The outer ends of the pinion gear teeth are rounded for line contact with and location by the drive cones to be described. The pinion gears and side gears therefore form a set of differential gearing 31 capable of rotating the axles 15 and 17 at the same or different speeds.

The wheel cones 19 and 21 form a part of clutch means 33 that connects the case 2 (by-passing the differential gearing 31) to the two axles 15 and 17. The clutch means 33 also includes a drive cone 35 that has a conical face 37 that is drivingly engageable with the conical outer face 39 of wheel cone 19 and a drive cone 41 that has a conical face 43 that is drivingly engageable with the conical outer face 45 of the wheel cone 21. The cones, or at least the mating faces, are preferably treated so that the surfaces are non-scoring, as by a phosphate and "Molycote" process known in the trade. The drive cones 35 and 41 rotate with the case 2 but can shift position along the axis of rotation of the case and for this purpose have radial lugs 47 that slidably fit in axially extending grooves 49 formed on the inside wall 51 of the housing 3. Clearances are provided for the drive cones so that they can "float" to a limited degree to enable them to adjust to the wheel cones when clutching forces are applied. The wheel cones are movable axially and rotatably relative to the case and are located in exact axial position by hubs 52 journaled in recesses 52A of the case.

It is to be noted that the mating conical faces of the wheel cones and drive cones are staggered in the sense that the outer and inner ends of the wheel cone face are located axially outwardly of the outer and inner ends of the drive cone face. This promotes even wear, helps eliminate dirt on the faces, avoids seating of one face in the other, gives smoother clutching action, and insures initial clutching contact on the smallest diameter of the mating faces. The mating conical faces are preferably formed on an angle of about 24° and the faces 37 and 43 of the drive cones are formed on a slightly greater (e.g. about 10 minutes) taper than the faces 39 and 45 of the wheel cones. This helps to insure initial contact on the smallest diameter which provides for variable clutching surfaces on the larger diameters and a "starter clutch" action. This feature plus limited flexing or elasticity of the relatively thin walled drive cones, along with the "floating" or self-adjustability of the cones, provides for smooth, noiseless clutching and unclutching action with unevenness dampened out and smooth conformity to any high points on the wheel cone faces, thus eliminating or minimizing chatter, clunking, or scoring at all times. The arrangement enables oil to be trapped on parts of the tapered surfaces, especially at low and slow torque demand. The differential has a quiet, smooth action with a feel of power under all conditions.

In further accord with the invention, the pinion gears 27 and 29 each have a hub means 53 of circular outer contour which operatively engages a larger radiused circular cam surface 57 or 59 on the drive cones 35 and 41, respectively. When the hub means are centered in the cam surfaces 57 and 59 full differentiation can occur but when they ride up the incline of these surfaces the drive cones tend to spread apart or outwardly toward opposite ends of the case to cause operative engagement of the inner and outer conical faces 37 and 39 and 43 and 45. This constitutes operation of the clutch means 33 so that power goes directly from the case 2 to both axles 15 and 17 through the clutch means.

The hub means 53 may comprise an annular hub stub 61 on the pinion gear 27 or 29 itself (FIGURE 4) but preferably comprises a ring 63 on a hub 65 of each pinion (FIGURE 3) which can rotate thereon so as to minimize wear on the cam surfaces 57 or 59. Another form of hub means 53 is shown in FIG. 5 as a plug 67 rotatably fitting in bore 69 of the pinion and having an annular flange or shoulder 71 to engage the cam surfaces.

In operation when the pinions 27 and 29 rotate about the axis of the side gears 23 and 25 at the same speed as the side gears and case 2, the hub means 53 will be substantially centered on the cam surfaces 57 and 59. However, if the pinions begin to rotate faster or slower than the side gears they will ride up one side or the other of the circular cam surfaces 57 and 59 and tend to force these surfaces apart thus tending to spread the drive cones 35 and 41 apart or outwardly toward opposite ends of the case. This causes operative engagement of the inner and outer conical faces 37 and 39 and 43 and 45 and operation of the clutch means 33 so that power goes directly from the case 2 to both the axles 15 and 17 through the clutch means.

Side thrust on the side gears and wheel cones 19 and 21 is transmitted directly into housing 2 by means of thrust washers 73 and 75 interposed between the ends of the wheel cone hubs and the adjacent faces of the case. The axle shafts 15 and 17 are prevented from pulling out of the case by snap rings 77 and 79 fitted in grooves on their inner ends which engage the inside faces of the side gears 23 and 25. Inward movement of the axles 15 and 17 is prevented by their abutment with cross pin 81 that fits at opposite ends in holes 83 and 85 in the housing 3 and fixed in position by a cross pin or screw 87. These features to prevent axle movement are not required for all installations and are used only if the axle installation of the vehicle concerned does not provide other means for controlling axial movement of the axle shafts.

Referring to FIGS. 6-9, the details of drive cone 35 in FIGS. 6 and 8 show the tapered inner face 91 that gives clearance for free rotation of the differential gearing 31 which is partially disposed inside the drive cone as can be seen in FIG. 1. FIG. 7 shows that four pinions 27A can be used, as well as the two of FIGS. 1-2, and FIGS. 6-8 reveal that in manufacture of the drive cone it is convenient to form four cam surfaces 57 so that it can be used in either a two or four pinion differential.

FIGURE 9 shows a drive cone 101 that may be used in a three pinion differential. This has lugs 103 corresponding to lugs 47 and three circular cam surfaces 105 corresponding to cam surfaces 57 or 59. Instead of a tapered face 91 to provide gear clearance, the cone 101 may for special applications have cut-outs 107 for free rotation of the pinion gears. It is understood that the back face of the cone 101 has a conical face (not shown) to correspond to face 37 or 43.

Referring to FIGS. 10-11, one of the washers 73 or 75 may be formed as a spring washer 111 by slitting and bending out resilient fingers 113 from the body thereof. These will exert a low, predetermined axial force or preload on the clutch means which in some applications may be desirable.

If desired, the wheel and drive cones may be lightly magnetized which will tend to attract them to each other and give a light preload. Such magnetizing will also serve to hold a suitable magnetizable lubricating metal on the parts to minimize scoring and chattering.

Modifications may be made without departing from the spirit and scope of the invention.

I claim:

1. A differential power transmission unit comprising a case adapted to be rotated by a power source about an axis of rotation, differential gearing inside the case including a pair of side gears and at least a pair of pinion gears, a pair of wheel cones inside the case adjacent the side gears, the side gears and wheel cones being adapted to drive a pair of axles, a drive cone for each wheel cone, each wheel cone and its drive cone having mating inner and outer conical surfaces, means connecting the drive cones to the case for rotation with the case and providing for shifting of the drive cones in a direction parallel to the axis rotation, cam means operative upon relative rotation of the side gears and case for shifting the drive cones toward the wheel cones so that said conical surfaces operatively engage each other whereby the case rotates the wheel cones through the drive cones, the mating conical surfaces on said wheel and drive cones being staggered along the axis of rotation.

2. A differential unit as set forth in claim 1 wherein the outer conical surface of said mating conical surfaces is formed on a slightly larger angle than the inner conical surface so that initial contact between the surfaces occurs at a minimum diameter.

3. A differential unit as set forth in claim 1 wherein said drive cones are self adjustable in the case.

4. A differential unit as set forth in claim 1 wherein the cone having said outer surface is slightly flexible elastically.

5. A differential unit as set forth in claim 1 wherein the outer conical surfaces are formed in the drive cones.

6. A differential power transmission unit comprising a case adapted to be rotated by power source about an axis of rotation, differential gearing inside the case including a pair of side gears and at least a pair of pinion gears, a pair of wheel cones inside the case adjacent the side gears, the side gears and wheel cones being adapted to drive a pair of axles, a drive cone for each wheel cone, each wheel cone and its drive cone having mating inner and outer conical surfaces, means connecting the drive cones to the case for rotation with the case and providing for shifting of the drive cones in a direction parallel to the axis of rotation, cam means operative upon relative rotation of the side gears and case for shifting the drive cones toward the wheel cones so that said conical surfaces operatively engage each other whereby the case rotates the wheel cones through the drive cones, the outer conical surface of said mating conical surfaces being formed on a slightly larger angle than the inner conical surface so that initial contact between the conical surfaces occurs at a minimum diameter.

7. A differential unit as set forth in claim 6 wherein at least one of each pair of mating cones is slightly flexible.

8. A differential unit as set forth in claim 7 wherein the cones having the outer conical surfaces are slightly flexible.

9. A differential as set forth in claim 8 wherein the outer conical surfaces are formed in the drive cones.

10. A differential power transmission unit comprising a case adapted to be rotated by a power source about an axis of rotation, differential gearing inside the case including a pair of side gears and at least a pair of pinion gears, the side gears being adapted to drive a pair of axles, clutch means inside the case and rotatably driven by the case and adapted to drive a pair of axles, said clutch means including a cam surface means and being actuated by pressure in said cam surface means parallel to the axis of rotation, said pinion gears having hub means engaging and operating said cam surface means.

11. A differential as set forth in claim 10 and characterized by the absence of a spider pin and the sole support of the pinion gears being by said side gears cam surface means and case.

12. A differential as set forth in claim 10 wherein said hub means and cam surface means are circular in shape.

13. A differential as set forth in claim 10 wherein said pinion gears have shanks formed thereon and said hub means comprises rings rotatably mounted on said shank.

14. A differential as set forth in claim 10 wherein said pinion gears have central apertures and said hub means comprises plugs with enlarged heads rotatably mounted in said aperture.

15. A differential as set forth in claim 10 wherein said clutch means comprises a pair of drive cones located respectively on opposite sides of said pinion gears and providing said cam surface means, said drive cones being connected to the case for rotation with it but being axially shiftable relative to the case, a pair of wheel cones in the case located respectively on opposite sides of said pinion gears and adjacent a drive cone and adapted to drive a pair of axles, said wheel cones being rotatably and axially movable relative to the dase, said drive and wheel cones having interengaging conical clutch faces held in operative engagement by pressure of the hub means on the cam surface means.

16. A differential as set forth in claim 15 wherein one of said pairs of cones is slightly flexible in a radial direction so that it conforms to the other of the cones upon the application of pressure from the hub means to the cam surface means.

17. A differential as set forth in claim 10 wherein said clutch means each comprises a pair of members at least one of which is magnetized.

18. A differential as set forth in claim 10 including a resilient thrust washer pressured by a side gear and preloading the clutch means.

References Cited

UNITED STATES PATENTS

| | | | |
|---|---|---|---|
| 1,193,709 | 8/1916 | Mennie | 74—713 X |
| 3,051,020 | 8/1962 | Hartupee | 74—710.5 |
| 3,186,258 | 6/1965 | Meldola | 74—710.5 |
| 3,224,299 | 12/1965 | Holdeman et al. | 74—711 |
| 3,250,354 | 5/1966 | Kebel | 192—84 X |
| 3,264,900 | 8/1966 | Hartupee | 74—711 |
| 3,330,169 | 7/1967 | Carrico et al. | 74—711 |
| 3,362,258 | 1/1968 | Thornton | 74—711 |
| 3,365,984 | 1/1968 | Musgrave | 74—713 |

ARTHUR T. McKEON, Primary Examiner